United States Patent
Ye

(10) Patent No.: US 6,690,505 B1
(45) Date of Patent: Feb. 10, 2004

(54) OPTICAL NETWORK EQUIPMENT WITH GAIN TRANSIENT CONTROL AND AUTOMATIC DRIFT COMPENSATION

(75) Inventor: Jun Ye, Palo Alto, CA (US)

(73) Assignee: Onetta, Inc., Sunnyvale, CA (US)

( * ) Notice: Subject to any disclaimer, the term of this patent is extended or adjusted under 35 U.S.C. 154(b) by 63 days.

(21) Appl. No.: 09/993,962

(22) Filed: Nov. 27, 2001

Related U.S. Application Data

(60) Provisional application No. 60/325,165, filed on Sep. 28, 2001.

(51) Int. Cl.[7] .................................................. H01S 3/00
(52) U.S. Cl. ....................................................... 359/337
(58) Field of Search .............................. 359/337, 337.1, 359/341.1, 341.41, 341.42

(56) References Cited

U.S. PATENT DOCUMENTS

| | | | |
|---|---|---|---|
| 5,245,690 A | 9/1993 | Aida et al. | 385/142 |
| 5,513,029 A | 4/1996 | Roberts | 359/177 |
| 5,745,283 A | 4/1998 | Inagaki et al. | 359/341 |
| 5,812,710 A | 9/1998 | Sigaya | 385/27 |
| 5,900,969 A | 5/1999 | Srivastava et al. | 359/341 |
| 6,049,413 A | 4/2000 | Taylor et al. | 359/337 |
| 6,061,171 A | 5/2000 | Taylor et al. | 359/337 |
| 6,094,298 A | 7/2000 | Luo et al. | 359/346 |
| 6,144,485 A | 11/2000 | Sugaya et al. | 359/337 |
| 6,163,399 A | 12/2000 | Berg | 359/341 |
| 6,166,850 A | 12/2000 | Roberts et al. | 359/341 |
| 6,198,572 B1 | 3/2001 | Sugaya et al. | 359/337 |
| 6,222,668 B1 | 4/2001 | Dutrisac et al. | 359/337 |
| 6,236,499 B1 | 5/2001 | Berg et al. | 359/341 |
| 6,341,034 B1 * | 1/2002 | Sun et al. | 359/341.41 |
| 6,366,393 B1 * | 4/2002 | Feulner et al. | 359/337 |
| 6,411,430 B1 * | 6/2002 | Ogino et al. | 359/337.11 |
| 6,525,873 B2 * | 2/2003 | Gerrish et al. | 359/341.4 |
| 6,542,287 B1 * | 4/2003 | Ye et al. | 359/334 |
| 2001/0017729 A1 * | 8/2001 | Sugaya et al. | 359/341.41 |
| 2001/0040721 A1 * | 11/2001 | Gerrish et al. | 359/341.41 |
| 2002/0093729 A1 * | 7/2002 | Gerish et al. | 359/341.41 |
| 2003/0030894 A1 * | 2/2003 | Stentz | 359/341.41 |

FOREIGN PATENT DOCUMENTS

| | | | |
|---|---|---|---|
| EP | 0 734 105 A2 | 9/1996 | H01S/3/06 |
| JP | 2001148527 A * | 5/2001 | H01S/3/10 |
| WO | 97/28584 | 8/1997 | H01S/3/00 |
| WO | 00/41346 A1 | 7/2000 | H04B/10/17 |

OTHER PUBLICATIONS

Suzuki et al. Power Excursion Suppression in Cascades of Optical Amplifiers with Automatic Level Control. IEEE Photonics Technology Letters, vol. 11, No. 8, Aug. 1999. pp. 1051–1053.*

(List continued on next page.)

Primary Examiner—Thomas G. Black
Assistant Examiner—Deandra M. Hughes
(74) Attorney, Agent, or Firm—G. Victor Treyz

(57) ABSTRACT

Optical network equipment is provided. The optical network equipment may include equipment with optical gain stages such as optical amplifiers. The equipment may be used in fiber-optic communications links in communications networks. The gain stages may be based on optically-pumped rare-earth-doped fiber. The equipment may include optical monitors that are used to measure the power of optical data signals propagating through the equipment. A control unit in the equipment may be used to analyze the optical data signal power measurements. The results of the analysis may allow the control unit to determine whether the amplifier output power is affected by gain transients or drift effects. Gain transients may be suppressed by making pump power adjustments. The control unit may compensate for the effects of drift by making pump power adjustments or by adjusting components such as variable optical attenuators or dynamic filters.

14 Claims, 12 Drawing Sheets

OTHER PUBLICATIONS

Sun et al. Optical Fiber Amplifiers for WDM Optical Networks: Bell Labs Journal, p. 187–206, Jan.–Mar. 1999.

Nortel Networks Data Sheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" 20th Optical Amplifiers with their Applications Technical Digest, Jun. 9–11, 1999.

Kahui et al. "Dynamic–Gain–Tilt–Free Long–Wavelength Band Erbium Doped Fiber Amplifiers Utilizing Temperature Dependent Characteristics of Gain Spectrum" 25th Optical Fiber communication Conference, Technical Digest, p. 6–8, (Mar. 8, 2000).

Delavaque et al. "Gain Control in Erbium–Doped Fiber Amplifiers by Lasing at 1480nm with Photoinduced Bragg Gratings Written on Fibre Ends" Electronics Letters, vol. 29, No. 12, p. 1112–1114, Jun. 10, 1993.

Massicott et al. "1480nm Pumped Erbium Doped Fiber Amplifier with all Optical Automatic Gain" Electronics Letters, vol. 30, No. 12, p. 962–964, Jun. 9, 1994.

Motoshima et al. "EDFA with Dynamic Gain Compression for Multiwavelength Transmission Systems" OFC '94 Technical Digest, p. 191–192.

Desurvire et al. "Gain Control in Erbium–Doped Fibre Amplifiers by an all Optical Feedback Loop" Electronics Letters, vol. 27, No. 7, p. 560–561, Mar. 28, 1991.

\* cited by examiner

OPTICAL NETWORK EQUIPMENT WITH GAIN TRANSIENT CONTROL AND AUTOMATIC DRIFT COMPENSATION

This application claims the benefit of provisional patent application No. 60/325,165, filed Sep. 28, 2001.

BACKGROUND OF THE INVENTION

The present invention relates to fiber-optic communications networks, and more particularly, to optical network equipment such as optical amplifiers with the ability to control gain transients and to make gain adjustments to compensate for drift effects.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

It is an object of the present invention to provide optical network equipment such as optical amplifiers that suppress gain transients due to fluctuations in input power and that compensate for drift effects due to temperature fluctuations or aging.

SUMMARY OF THE INVENTION

This and other objects of the invention are accomplished in accordance with the present invention by providing optical amplifiers and other optical network equipment for use in handling optical data signals in a signal band in fiber-optic communications links. The fiber-optic communications links may carry a number of wavelength-division multiplexing channels each having a different corresponding wavelength. The equipment may include optical gain stages for providing optical gain for the optical signals. The gain stages may be based on optically-pumped fiber. Laser diode pump lasers may be used to pump the fiber.

Sudden fluctuations in the input power of the optical data signals may result from changes in the number of channels being carried in the signal band. Optical taps and monitors may be used in the equipment to make power measurements that reveal these fluctuations. A control unit may adjust the pump power provided by the laser diodes in real time based on the power measurements to ensure that the gain in the optically pumped fiber does not experience significant gain transients.

Slower fluctuations in the input of the optical data signals may result from changes in the temperature of the transmission fiber in a given span in the fiber-optic communications link or changes in the temperature of other optical components in the system. Slower changes may also result from aging effects. Because of temperature-induced and aging-induced drift effects, the input power to the equipment in the link may not be stable. As a result, the output power of the equipment may not be stable unless the gain level of the equipment is adjusted slightly to compensate.

To avoid conflicts with the transient control capabilities of the equipment, the control unit may automatically determine which power changes are fast changes that require real-time pump power adjustments to prevent gain transients and which changes are slow changes that require gain level adjustments to ensure a constant output power.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
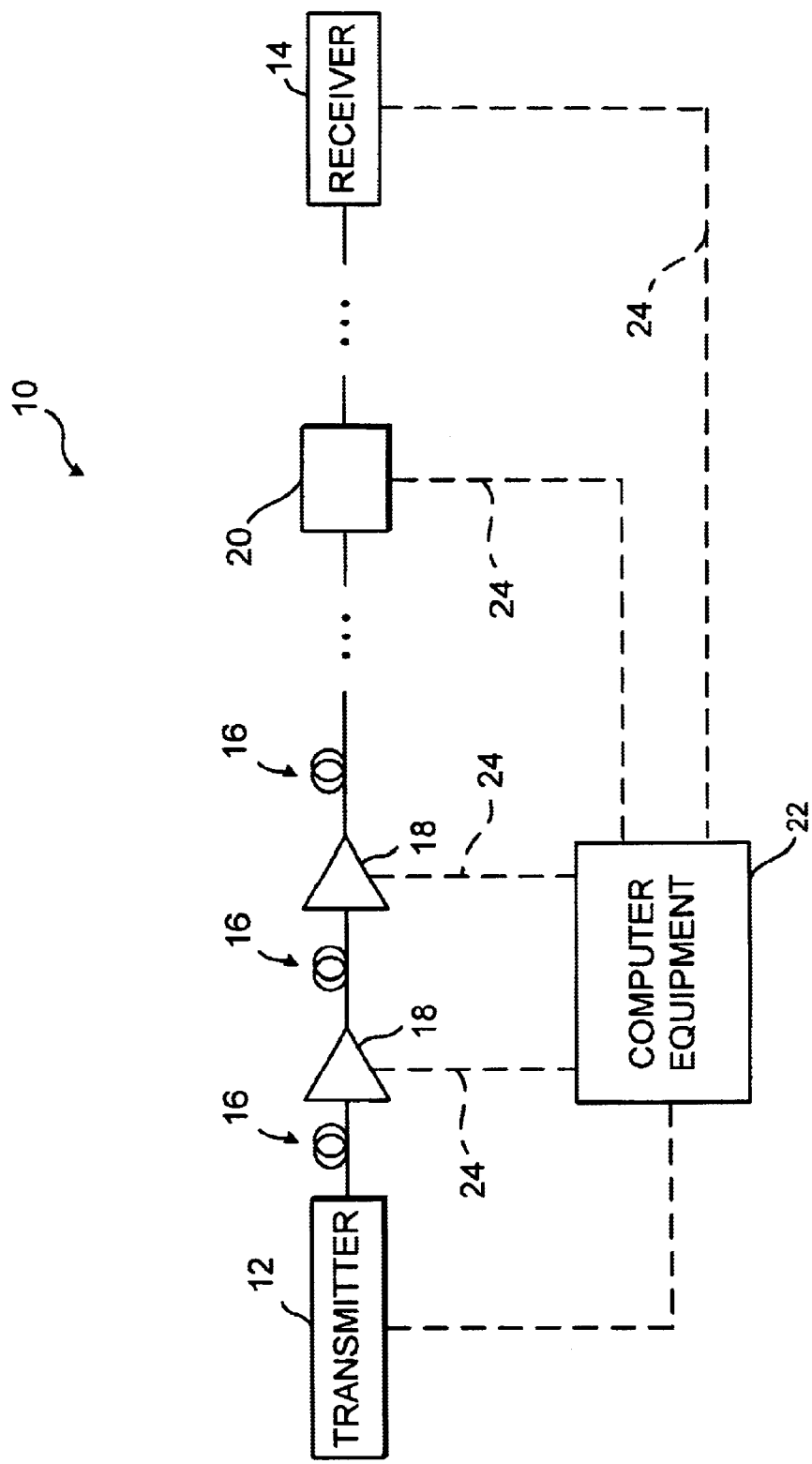
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. For clarity, aspects of the present invention will be described primarily in the context of optical amplifiers. This is, however, merely illustrative. The features of the present invention may be used in any suitable optical network equipment 20 if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Figure 2:
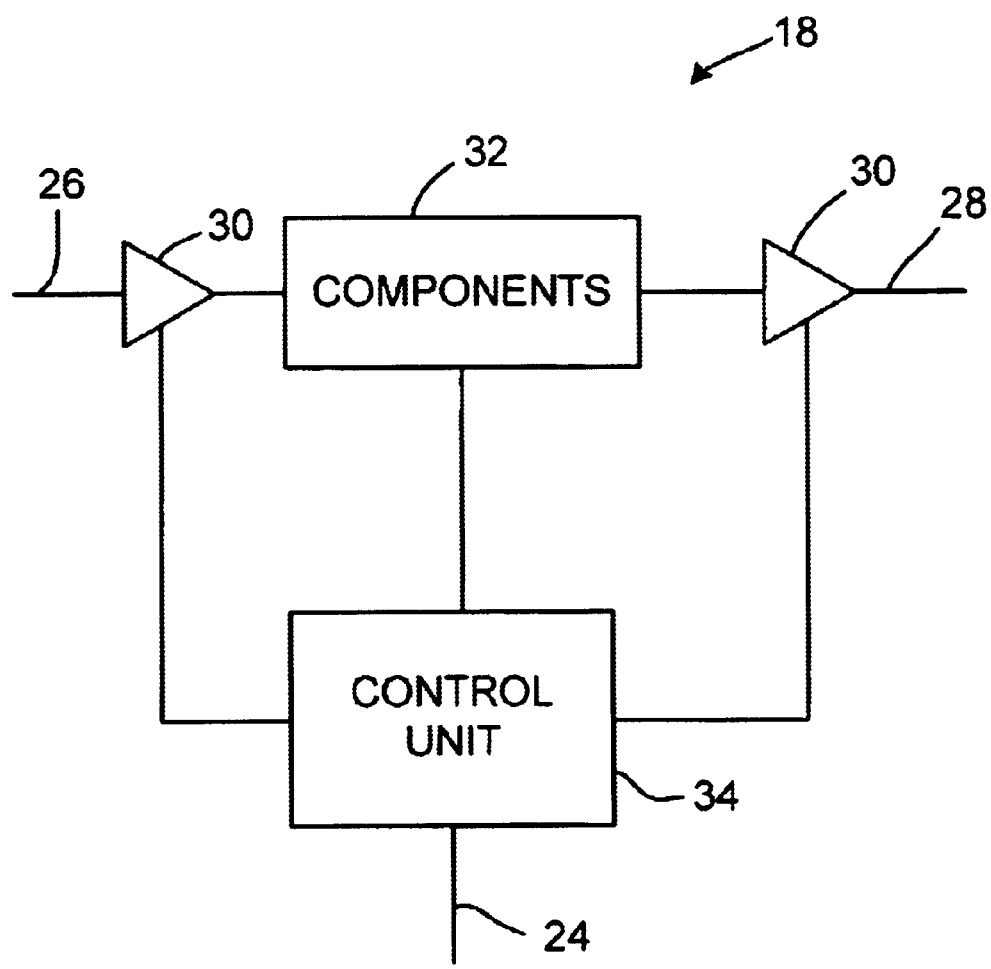
FIG. 2 is a schematic diagram of an illustrative optical amplifier in accordance with the present invention.

An illustrative optical amplifier 18 is shown in FIG. 2. Optical input signals may be provided to input fiber 26. The optical input signals may be, for example, data traffic being carried on the wavelength-division-multiplexing channels in the signal band of link 10 that is provided to input fiber 26 over a span of fiber 16. Gain stages 30 may be used to provide optical gain for the optical signals. Corresponding amplified output signals may be provided at output fiber 28.

Amplifier 18 may contain components 32. Components 32 may include optical components that handle the optical data signals traveling from input 26 to output 28 and may include other components (e.g., temperature controllers such as thermoelectric cooling elements or TECs, pumps, optical monitors, etc.). Two gain stages 30 are shown in FIG. 2, but in general any suitable number of gain stages (e.g., one, two, three, or more gain stages) may be used in amplifier 18. Components 32 are shown as being located between gain stages 30 in the example of FIG. 2, but this is merely illustrative. Components 32 may be positioned at any suitable location in amplifier 18 if desired. Optical components 32 may include optical switches, dispersion compensation elements, controllable dispersion compensation elements, static and dynamic spectral filters, pump couplers, taps and corresponding optical monitors, optical channel monitors, isolators, tilt controllers, variable optical attenuators, dispersion-compensating fiber and optically pumped fiber, add/drop multiplexers, or any other suitable optical components.

A control unit 34 may be used to control the operation of components such as gain stage components and components 32. Control unit 34 may be based on any suitable control circuitry and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc. Control unit 34 may include communications circuitry that supports the communications between control unit 34 and computer equipment such as computer equipment 22 of FIG. 1 or other equipment in the network over a path such as path 24.

Amplifier 18 may be based on an optical network card and may use the communications circuitry to communicate with a controller mounted in a rack in which the card is mounted when installed amplifier 18 is installed a network. With this arrangement, the controller may be part of computer equipment 22 or may communicate with computer equipment 22. If desired, amplifier 18 may be implemented as a module that is part of an optical network card. The module may use the communications circuitry in unit 34 to communicate with a controller or other computer equipment 22 or to communicate with additional communications circuitry on the card that in turn supports communications with a controller or other computer equipment 22 in the network. These are merely illustrative communications arrangements that may be used to allow amplifier 18 to communicate with other equipment. Any suitable arrangement may be used if desired.

Figure 3:
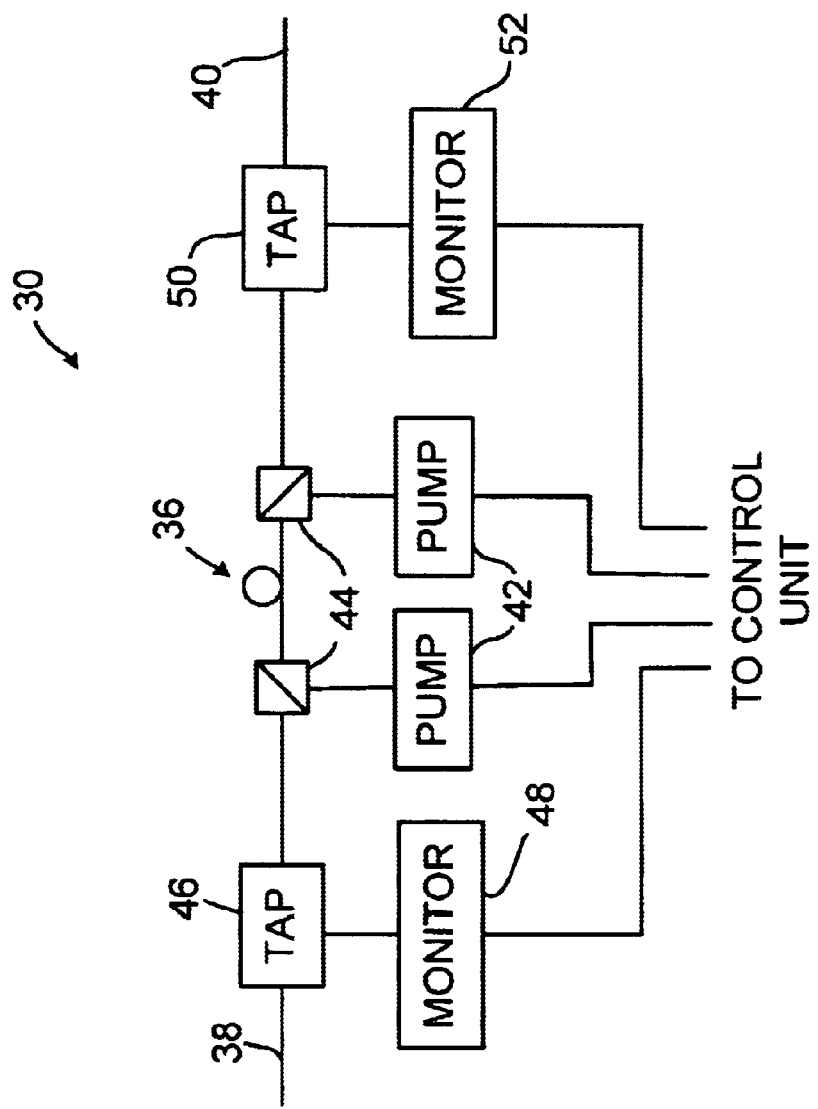
FIG. 3 is a schematic diagram of an illustrative optical amplifier gain stage in accordance with the present invention.

A schematic diagram of an illustrative optical gain stage 30 based on optically-pumped fiber is shown in FIG. 3. In the example of FIG. 3, the gain stage 30 includes an optically-pumped fiber 36 for providing optical amplification for the optical data signals being handled by amplifier 18. Input signals may be received at fiber 38. After amplification by fiber 36, the amplified signals may be provided at fiber output 40.

Fiber 36 may be optically pumped by pumps such as pumps 42. Pumps 42 may be laser diodes or other suitable sources of pump light. Fiber 36 may be erbium-doped fiber or other rare-earth-doped fiber. Raman-pumped fiber may also be used to provide optical gain. If fiber 36 is erbium-doped fiber, pumps 42 may operate at wavelengths such as 980 nm or 1480 nm or other suitable wavelengths. If fiber 36 is Raman pumped, the wavelength or wavelengths of the pump light may be a Stokes shift in wavelength (13 THz in frequency) below the signal band in which the optical data signals are located.

Pump light from pumps 42 may be coupled into fiber 36 by pump couplers such as pump couplers 44. Pump couplers 44 may be wavelength-division-multiplexing couplers or any other suitable pump couplers. In the example of FIG. 3, only one coil of fiber 36 is shown. This is merely illustrative. Any suitable number of coils of fiber or other gain elements (e.g., semiconductor optical amplifier devices, etc.) may be used to provide gain in stages 30 if desired. Fiber 36 is shown as being both copumped and counterpumped. If desired, fibers such as fiber 36 may be only copumped or only counterpumped.

Amplifier 18 may have taps and optical monitors for tapping a fraction (e.g., 2%) of the light propagating through amplifier 18. In the example of FIG. 3, gain stage 30 has an input tap 46 and corresponding optical monitor 48 for measuring the power of the optical data signals at fiber 38. Output tap 50 and corresponding optical monitor 52 may be used to make output power measurements at fiber 40. The optical monitors may be based on photodetectors or any other suitable optical monitoring arrangement. Transimpedance amplifiers in the monitors or in control unit 34 may be used to convert current signals from the photodetectors in the monitors into voltage signals for processing by analog-to-digital converters or other suitable processing circuitry. The processing circuitry may be located in the monitors or in control unit 34.

In a typical wavelength-division-multiplexing configuration, multiple optical data channels are carried over a link such as link 10. Each channel has an associated wavelength. Due to an intentional system reconfiguration or an accidental fiber cut, a number of the channels (e.g., 20 out of 40 total channels) may be abruptly dropped. Channels may also be added (e.g., due to a system reconfiguration). In a typical network, any number of channels may be added or dropped.

Figure 4:
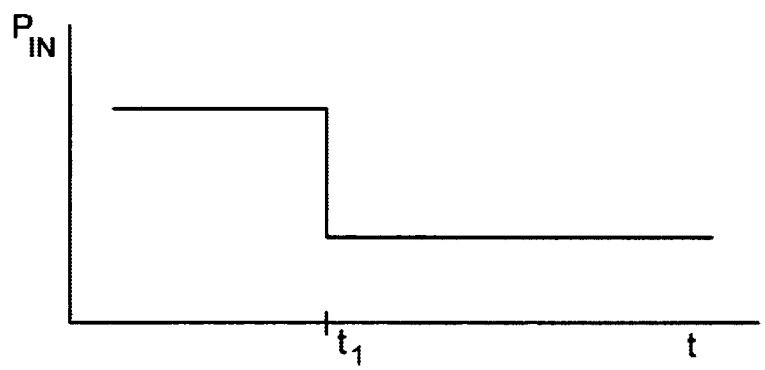
FIG. 4 is a graph showing how the input power to an optical amplifier may vary suddenly when the number of channels being carried by a communications link changes.

If the total number of channels being provided at the input to a given amplifier drops in half, the total input power for the amplifier may also drop in half (or some other amount based on the channel powers), as shown at time $t_1$ in FIG. 4. This type of input power fluctuation can cause transients in the gain of the amplifier if the amplifier does not have transient control capabilities. In particular, because the signal loading is suddenly less than the previous steady-state value, the gain of the amplifier can rise suddenly at time $t_1$ if the amplifier gain is not controlled. In an erbium-doped fiber amplifier, for example, the gain will rise with a time constant on the order of microseconds due to a rise in the inversion level of the erbium-doped fiber in the amplifier. The remaining channels in the system will then experience the increased gain. As a result, the output powers of these channels from the amplifier will track the sudden rise in the gain of the amplifier.

Arrangements such as the tap and monitor arrangement of FIG. 3 may be used to measure the input and output power of the optical data signals in gain stage 30. Control unit 34 may measure the gain of the gain stage by determining the ratio of the measured output power to the measured input power in real time. Control unit 34 may adjust the pump power produced by pumps 42 accordingly to ensure that the inversion level in fiber 36 remains constant. This type of transient control scheme may be used to suppress gain transients that would otherwise arise due to channel add/drop events.

Figure 5:
FIG. 5 is a graph showing the gain of an illustrative optical amplifier with transient control capabilities as the input power varies according to the graph of FIG. 4 in accordance with the present invention.
Figure 6:
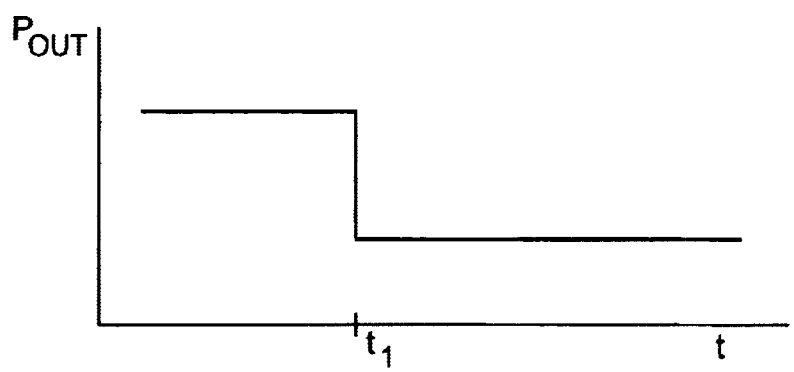
FIG. 6 is a graph showing the output power of an illustrative optical amplifier with transient control capabilities that is handling the input power signal of FIG. 4 in accordance with the present invention.

The gain fluctuation of an illustrative amplifier 18 with transient control capabilities is shown in FIG. 5. As shown in FIG. 5, although the input power changes abruptly at time $t_1$ (FIG. 4), the gain G (and therefore the output power per channel $P_{CH}$) does not vary significantly at time $t_1$. As a result, the total output power of the amplifier accurately tracks the total input power, as shown in FIG. 6.

In amplifiers 18 with multiple gain stages 30, gain transients may be controlled by using input and output taps and monitors before and after each of the gain stages, by using input and output taps and monitors that span multiple gain stages, by using other suitable monitoring arrangements, or by using a combination of such arrangements.

Another suitable gain transient suppression technique involves monitoring the powers associated with one or more active channels using a tap and optical channel monitor or an optical monitor having a spectral filter that isolates an active channel. With this type of technique, the output power per channel may be measured. Control unit 34 may adjust stage 30 in real time to maintain the measured output power per channel at a constant level, which suppresses gain transients.

If desired, output power measurements may be used in suppressing transients due to input power fluctuations. For example, control unit 34 may monitor the output power from an amplifier or gain stage using a tap such as tap 50 of FIG. 3 and an optical monitor such as optical monitor 52 of FIG. 3. If the number of channels that is being amplified remains constant, using control unit 34 to maintain the output power of amplifier 18 at a constant desired level even as the input power level varies will suppress output power transients.

Control unit 34 may control stages such as stage 30 based on input power measurements. For example, the pump power for stage 30 may be increased or decreased appropriately as soon as a significant input power fluctuation is detected. This type of feed-forward control scheme may be used with or without using feedback. Feedback control techniques involve measuring the gain or output power of the amplifier (or gain stage) and adjusting the pump level or other parameter of the amplifier in real time to maintain a desired gain or output power level. Such techniques may be used independently or in combination with feed-forward control techniques.

If desired, gain transient control techniques may be used that involve one or more input or output spectral filters. Such filters may modify the entire spectra of the tapped input and output signals or may be used to make power measurements for a particular channel or channels. The modified measured powers or the power of the particular channel or channels may be used in a feed-forward control scheme, a feedback control scheme, a hybrid feed-forward/feedback control scheme, or other suitable control scheme for adjusting the pump powers. Spectral filters may be used to modify the spectral shape of the tapped light that is monitored by monitors such as monitors 48 and 52 of FIG. 3, so that feedback and feed-forward techniques may be used when the gain spectrum of gain stage 30 or the gain spectrum of the rare-earth-doped fiber or other gain medium in the gain stage is not flat.

Amplifier 18 may be operated in different modes. In constant current mode, pumps 42 may be driven at a constant current level. In constant power mode, pumps 42 may be adjusted as needed to ensure that the output power remains constant. In either of these modes, significant changes in input power (e.g., due to channel add/drop events) will cause significant gain transients and therefore significant variations in the power per channel at the amplifier output.

In constant gain mode, control unit 34 monitors the optical data signals in the amplifier and adjusts the pump power of pumps 42 to prevent changes in the gain of the amplifier. This ensures that the power of each channel will remain stable, even as channels in the system are added or dropped.

Gain transients typically involve time scales on the order of microseconds in rare-earth-doped fiber amplifiers. If the input power to the amplifier changes at this rate while the amplifier is operating in constant gain mode, the amplifier may use its transient control capabilities to suppress gain transients.

Power drift effects occur more slowly (e.g., five orders of magnitude more slowly or more). Such drift effects are typically due to temperature changes in the transmission fiber spans 16 or other components. Drift may also be caused by aging effects. When an amplifier is operated in constant gain mode to suppress gain transients, the gain of the amplifier is constant. As a result, the output power will drift whenever the input power drifts. For example, if the input power drifts slightly higher, the output power will also drift higher. If the output power drifts too high or too low, however, the communications link may not operate properly. Optical powers that are too low may make the link susceptible to noise. Optical powers that are too high may lead to nonlinear optical effects.

Accordingly, control unit 34 may be configured to automatically analyze the time dependence of the optical data signals being amplified by the amplifier. Rapid signal fluctuations correspond to gain transients, so the control unit 34 may adjust the pump power of the amplifier as needed in response to such rapid fluctuations to ensure that the gain of the amplifier remains constant. Slower signal fluctuations correspond to drift. To compensate for the effects of drift, control unit 34 may slowly adjust the gain level as needed in response to these slow fluctuations. This approach ensures that slowly varying changes in the input power to the amplifier due to drift do not propagate to the output of the amplifier (or gain stage).

The network management system need not be involved in these control decisions. Rather, control unit 34 may be configured to automatically recognize the difference between a fast power transient and a slow drift effect. When the input power to the amplifier changes rapidly, the input power change is due to a transient effect (e.g., a channel add/drop event) and the gain of the amplifier should be held constant. When the input power to the amplifier changes slowly, the input power change is due to drift (e.g., due to slow temperature variations) and the gain of the amplifier should be adjusted to compensate for the drift. Both of these control processes may be simultaneously implemented by control unit 34 in real time to ensure that the output power per channel of amplifier 18 remains fixed despite add/drop events and temperature-induced drift and without the active intervention of the network management system.

Figure 7:
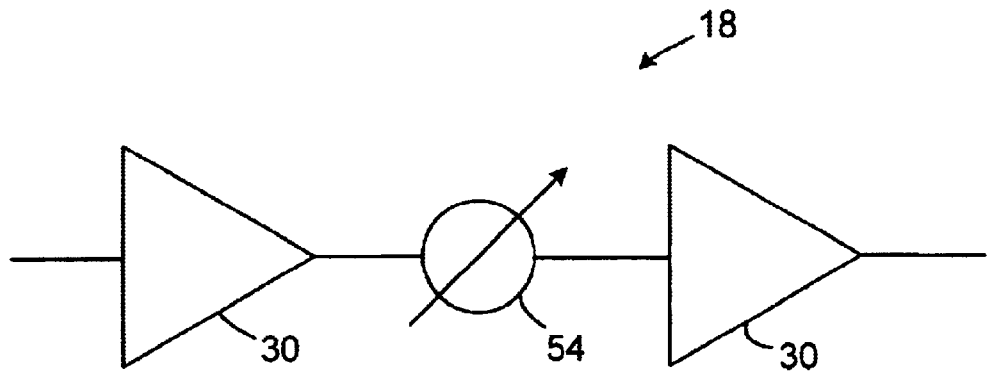
FIG. 7 is a schematic diagram of an optical amplifier having a variable optical attenuator in accordance with the present invention.

As shown in FIG. 7, amplifier 18 may have a variable optical attenuator 54. Variable optical attenuators such as variable optical attenuator 54 may be used to avoid producing gain tilt when making gain level adjustments in amplifier 18. Variable optical attenuators may be located between gain stages 30 or may be considered to be part of gain stages 30.

Figure 8:
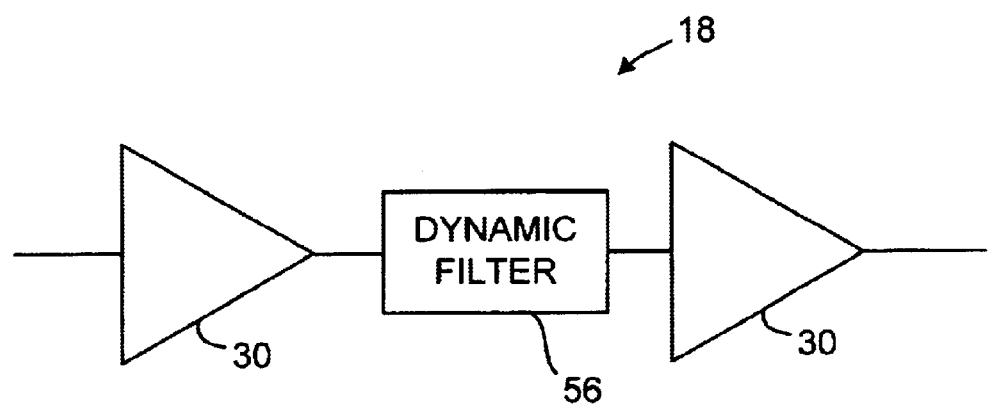
FIG. 8 is a schematic diagram of an optical amplifier having a dynamic spectral filter in accordance with the present invention.

Another suitable component that may be used to prevent the introduction of gain tilt during gain adjustments is a dynamic spectral filter. An amplifier 18 with a dynamic spectral filter 56 is shown in FIG. 8. During gain level adjustments, control unit 34 may adjust the pump powers of the pumps in gain stages 30. This may change the gain and inversion level in the optically-pumped fiber coils (e.g., in the erbium-doped fiber coils). As a result, the gain change may be accompanied by a gain tilt, which may be removed by adjusting dynamic filter 56 to produce an appropriate corrective filter spectrum. If desired, control unit 34 may make pump power adjustments and dynamic filter adjustments simultaneously. An optical channel monitor may be used to provide feedback to the control unit for use in controlling the pumps and dynamic filter to produce a desired gain spectrum or optical data signal power spectrum.

Dynamic filter 56 may be referred to as a dynamic gain equalization or dynamic gain flattening filter, because dynamic filter 56 may be used alone or in combination with a static spectral filter to flatten the gain spectrum of amplifier 18. In general, dynamic filter 56 may be used to produce any desired spectral shape.

Dynamic filter 56 may be formed using any suitable filter arrangement capable of producing a desired controllable loss or gain spectrum. Suitable filters may be based on microelectromechanical system (MEMS) devices, may be based on acoustooptic devices (e.g., acoustooptic fiber devices), may be based on thermo-optic arrayed waveguide devices, may be based on liquid crystals, may use electrooptic devices, may be based on semiconductor devices, may be based on electrooptically-induced or mechanically-induced gratings, may use controllable Raman pump lasers that pump dispersion-compensating fiber or other suitable fiber to produce a controllable Raman gain spectrum, or may be based on any other suitable dynamic filter arrangement.

Fiber-based filters may be based on tunable fiber Bragg grating mirrors or tunable fiber Bragg gratings that couple light into a fiber cladding mode. Fiber Bragg gratings may be formed by using acoustooptic modulation, by physically-inducing stresses (e.g., using a periodic comb structure that presses into the fiber), by etching into the fiber, or by using ultraviolet light and masks to produce periodic changes in the refractive index of the fiber. Fiber Bragg gratings may be tuned using heat or stress (e.g., stretching). These techniques are merely illustrative. Any suitable fiber-based dynamic filters 56 may be used if desired. Filters 56 may include filter elements that operate in transmission or reflection. Circulators or other structures may be used to allow reflective filter elements to be used in filters 56 that are operated in transmission. Such circulators or other structures may be considered to be part of the filters 56.

If desired, a tilt controller or other filter may be used that has more limited spectral adjustment capabilities. Combinations of variable optical attenuators, tilt controllers and other spectral filters and optical components may also be used in amplifier 18. Such components may be used to allow the gain level of amplifier 18 to be adjusted to compensate for drift effects without introducing undesirable spectral tilt.

Figure 9:
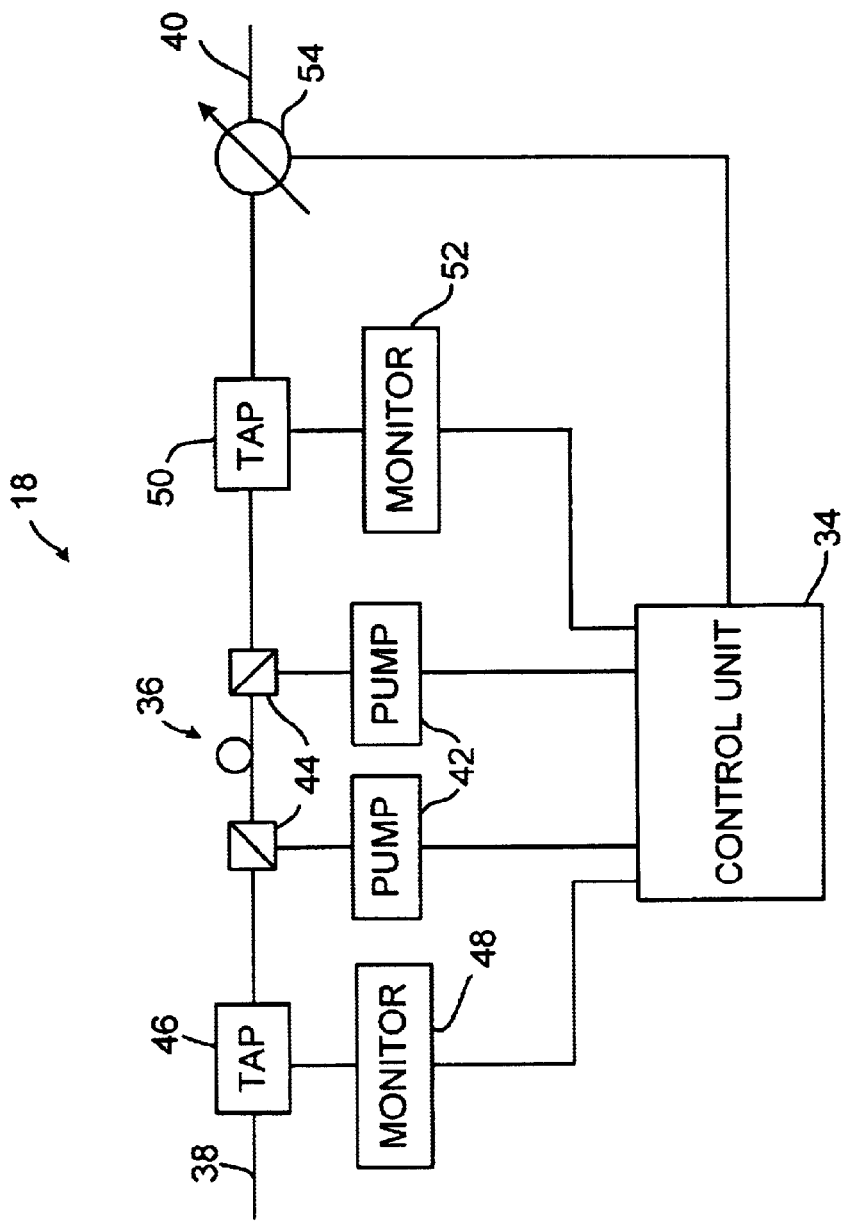
FIG. 9 is a schematic diagram of an optical amplifier gain stage arrangement in which optical taps and monitors are used to provide gain transient control capabilities and a variable optical attenuator is used to make power level adjustments in accordance with the present invention.

An illustrative amplifier arrangement that may be used to provide optical amplification is shown in FIG. 9. The components of FIG. 9 may form an amplifier 18 or may be a gain stage that forms a portion of a multistage amplifier 18. If the FIG. 9 arrangement is used as an amplifier that is part of a larger multistage amplifier configuration, each gain stage may be housed in a separate package or one or more shared packages may be used.

With the amplifier 18 of FIG. 9, taps 46 and 50 and monitors 48 and 52 may be used to monitor the gain of fiber coil 36 in real time. A single fiber coil 36 is shown in FIG. 9 for clarity. Additional fiber coils and other pumping arrangements may be used if desired. Control unit 34 may determine the gain G of amplifier 18 (or the individual gains or collective gain of the gain stages 30 in a multistage amplifier) in real time (e.g., by computing the ratio of the optical power at tap 50 to the optical power at tap 46) and may suppress gain transients by adjusting the pump power produced by pumps 42 as needed (e.g., using feedback control techniques) to ensure that the measured gain and therefore the inversion level of fiber 36 remains constant.

At the same time that control unit 34 is monitoring the gain of amplifier 18 to suppress fast gain transients, control unit 34 may monitor slower changes in the power of the optical data signals. Such slower changes may be monitored, for example, by monitoring the input power $P_{IN}$ to amplifier 18 using tap 46 and monitor 48 or by monitoring the output power $P_{OUT}$ (which tracks the input power due to the constant transient-controlled gain of amplifier 18) using tap 50 and monitor 52. If other taps and monitors are used, the power of the optical data signals may be monitored at other locations along the fiber path through amplifier 18.

Control unit 34 may analyze the monitored powers to distinguish between fast transient events (requiring fast pump power changes to maintain the gain of amplifier 18 constant) and slow drift effects (requiring gain level adjustments to compensate for the drift and thereby maintain the output power at fiber 40 constant). The gain level for an amplifier of the type shown in FIG. 9 may be adjusted to compensate for drift effects by adjusting variable optical attenuator 54 in a dB-for-dB fashion relative to the desired gain level change to reduce or increase the power exiting coil 36 before that power is provided as the amplifier output at output 40. During these adjustments, the inversion level and the gain of rare-earth-doped fiber coil 36 remain constant, so no spectral tilt is introduced in amplifier 18.

Figure 10:
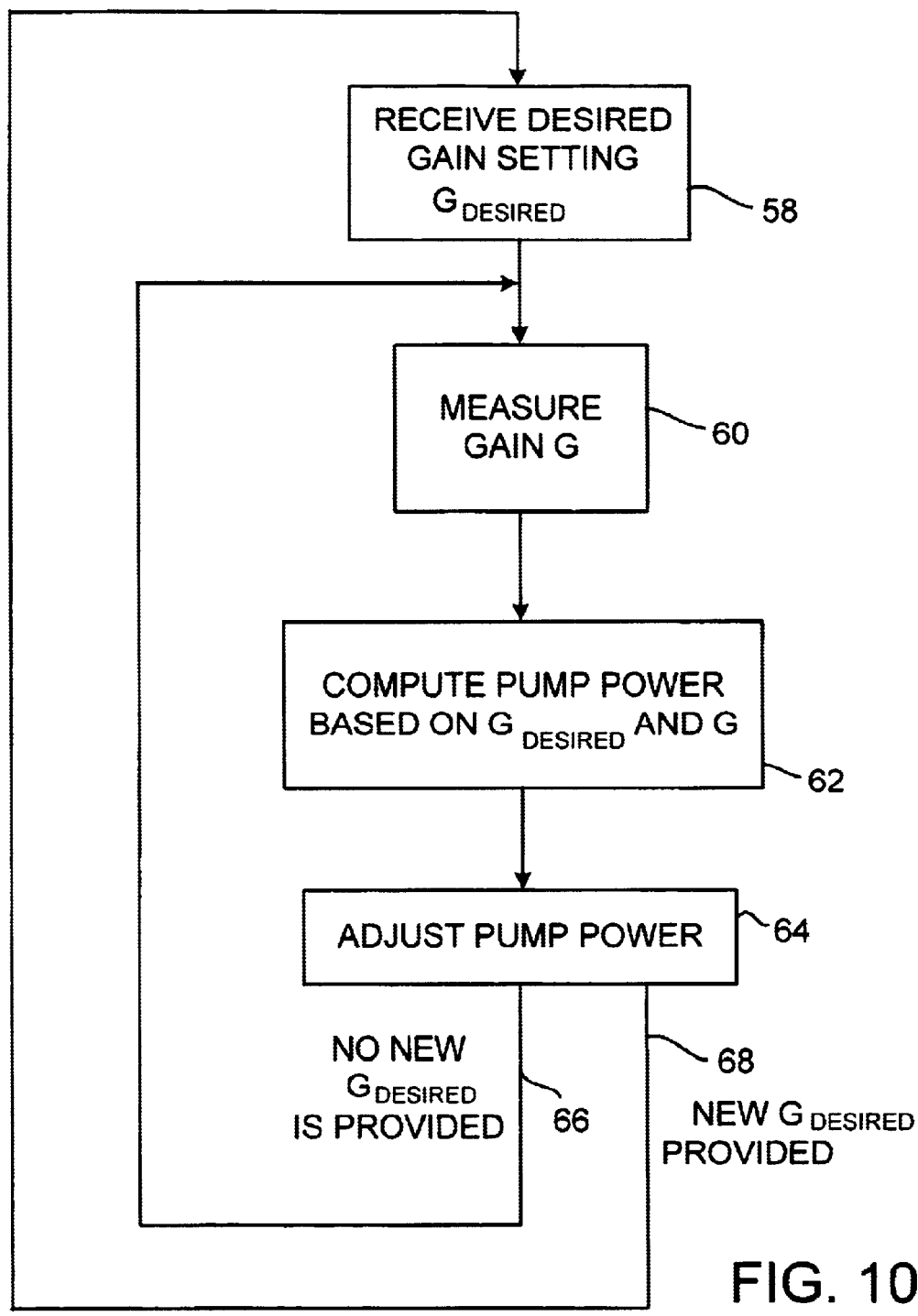
FIG. 10 is a flow chart of illustrative steps involved in controlling gain transients using the optical amplifier arrangement of FIG. 9 in accordance with the present invention.
Figure 11:
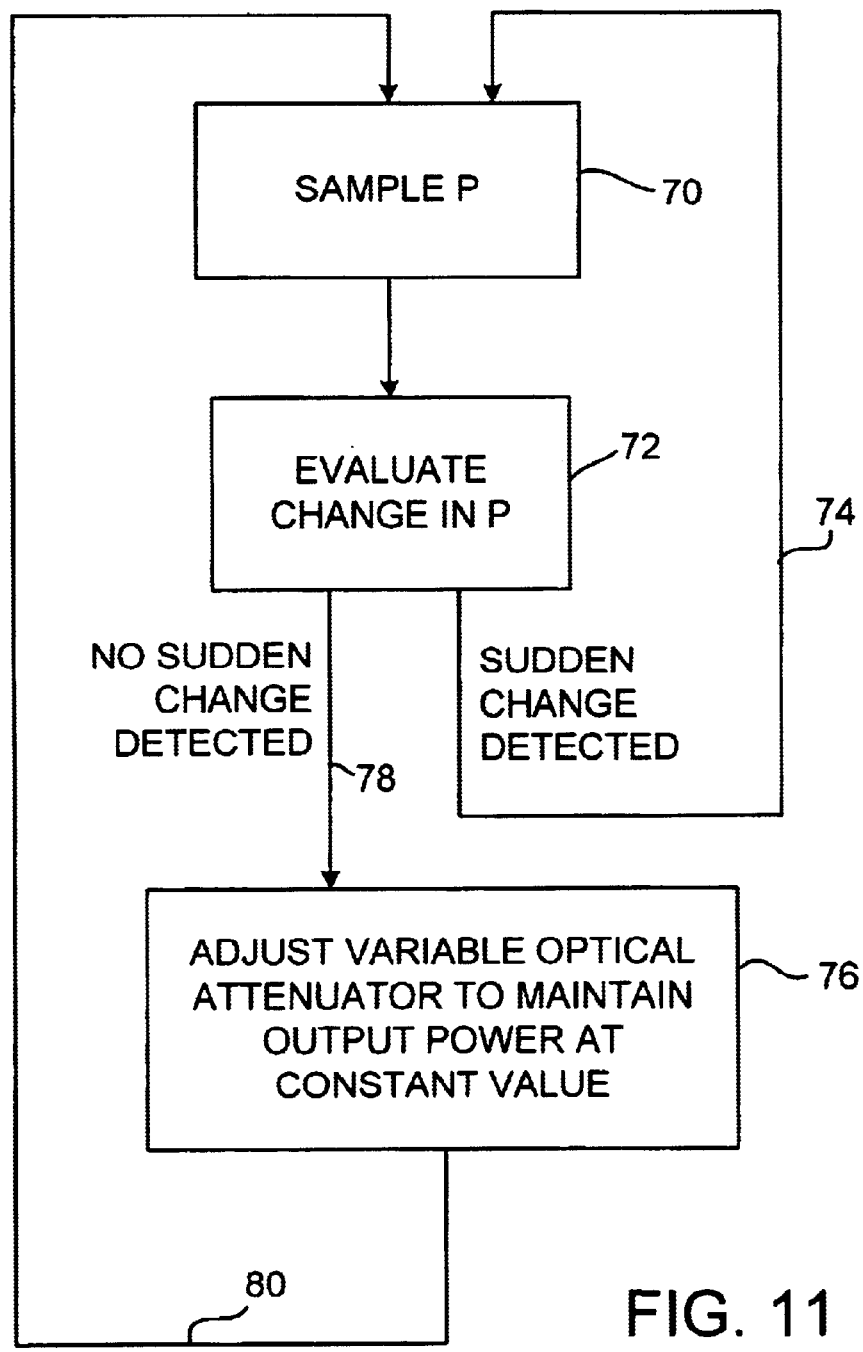
FIG. 11 is a flow chart of illustrative steps involved in automatically adjusting an optical amplifier of the type shown in FIG. 9 to produce a constant output power without adversely affecting the gain transient control process of FIG. 10 in accordance with the present invention.

Illustrative steps involved in using control unit 34 to suppress gain transients while compensating for drift effects are shown in FIGS. 10 and 11. The illustrative steps of FIGS. 10 and 11 may be used in operating an amplifier of the type shown in FIG. 9 in which variable optical attenuator 54 is located outside of taps 46 and 50, rather than between taps 46 and 50.

An illustrative gain transient control process that may be used with the amplifier of FIG. 9 is shown in FIG. 10. At step 58, control unit 34 may receive information on a desired new gain setting $G_{DESIRED}$. For example, control unit 34 may receive a value for $G_{DESIRED}$ provided from the network management system over a path 24 or a new gain value may be received that was generated or provided to control unit 34 locally at the amplifier.

At step 60, the gain of amplifier 18 may be measured. For example, control unit 34 may use tap 46 and monitor 48 of FIG. 9 to make power measurements on the optical data signals provided at the input to amplifier 18 before coil 36 and may use tap 50 and monitor 52 to measure the optical data signal power after coil 36. By computing the ratio of the power measured using tap 50 and monitor 52 (the output power of coil 36), to the power measured using tap 46 and monitor 48, control unit 34 may determine the gain G of coil 36 in real time. The gain G of coil 36 of FIG. 9 is the gain of the portion of amplifier 18 before variable optical attenuator 54.

At step 62, the appropriate pump power to provide to coil 36 may be computed using any suitable control technique. As an example, control unit 34 may determine the difference between the desired gain $G_{DESIRED}$ and the current measured gain G and may calculate the pump power required to minimize this difference using a feedback control technique such as the proportional-integral-derivative (PID) technique.

At step 64, the pump power applied to coil 36 may be adjusted by control unit 34 based on the results of step 62.

If the desired gain level is changed (e.g., if a change gain command is provided by the network management system), control may loop back to step 58, so that information on the new desired gain level may be taken into account when determining the pump power for the amplifier, as shown by line 68.

If the desired gain level is not changed, control may loop back to step 60, as shown by line 66.

The process of FIG. 10 suppresses gain transients that might otherwise arise due to sudden fluctuations in input power (e.g., due to channel add and drop events).

At the same time that the gain transient control process of FIG. 10 is being run on control unit 34, control unit 34 may run a drift compensation process of the type shown in FIG. 11.

Control unit 34 may use the process of FIG. 11 to determine whether or not transient control operations are taking place. If a transient event is taking place, no amplifier adjustments are made to compensate for drift effects. If, however, no transient events are taking place, control unit 34 may compensate for drift.

At step 70, control unit 34 may make power measurements on the optical data signals in amplifier 18. For example, control unit 34 may acquire input power samples or output power samples using taps such as taps 46 and 50 and monitors such as monitors 48 and 52. The input and output tap locations of FIG. 9 are merely illustrative. If desired, the control unit may acquire power samples using a tap and monitor located at other suitable locations in the optical path of amplifier 18.

At step 72, the control unit may evaluate the measured signal power. For example, the control unit may examine samples that have been acquired to determine whether the signal power is changing rapidly or whether the signal power is fairly stable.

If the optical data signal power is changing rapidly, this is indicative of a transient event (e.g., a transient due to a channel add or drop event). As a result, control may loop back to step 70, as shown by path 74.

If the optical data signal power is not changing rapidly, then no sudden change in power has been detected and control may pass to step 76, as shown by path 78.

At step 76, control unit 34 may adjust variable optical attenuator 54 of FIG. 9 to maintain the output power (e.g., the power at fiber output 40 of FIG. 9) at a constant value. For example, if the sample information or other power measurement information acquired at step 70 indicates slightly elevated signal powers, the attenuation produced by variable optical attenuator 54 may be increased by a corresponding amount. If the sample information or other information acquired at step 70 indicates slightly reduced signal powers, the attenuation produced by variable optical attenuator 54 may be decreased by a corresponding amount. Control may then loop back to step 70, as shown by path 80.

Variable optical attenuator 54 helps to ensure that the output power of the optical data signals at output 40 remains constant and is not subject to the effects of drift (e.g., due to temperature-induced input power variations). In amplifiers with subsequent gain stages located downstream from fiber 40, the adjustment of variable optical attenuator 54 to ensure a constant drift-compensated output power at fiber 40 may prevent the output power of constant gain stages from drifting or may help prevent the introduction of gain tilt in downstream stages operated in constant output power mode or constant current mode.

Figure 12:
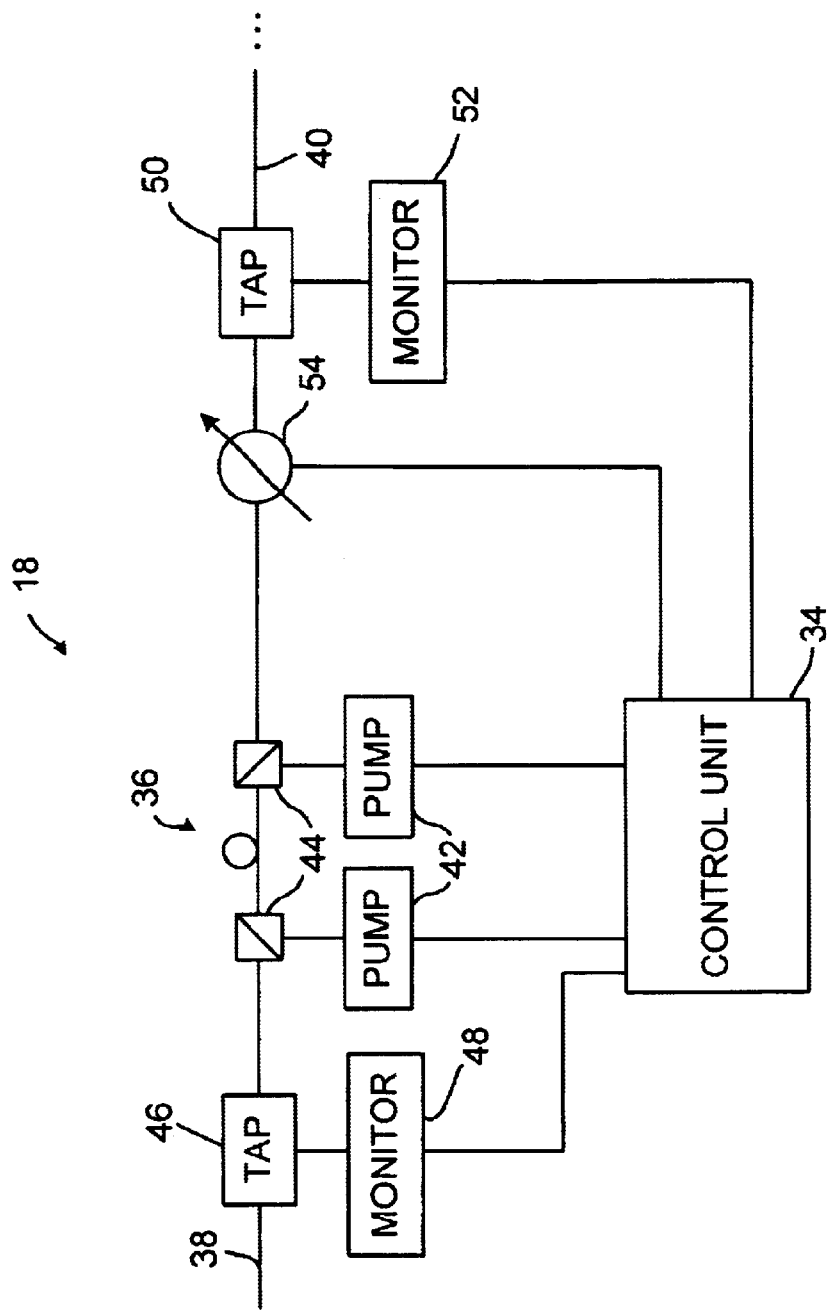
FIG. 12 is a schematic diagram of an optical amplifier gain stage arrangement in which optical taps and monitors are used to provide gain transient control capabilities and a variable optical attenuator in the optical path between the optical taps is used to prevent gain tilt during gain adjustments in accordance with the present invention.
Figure 13:
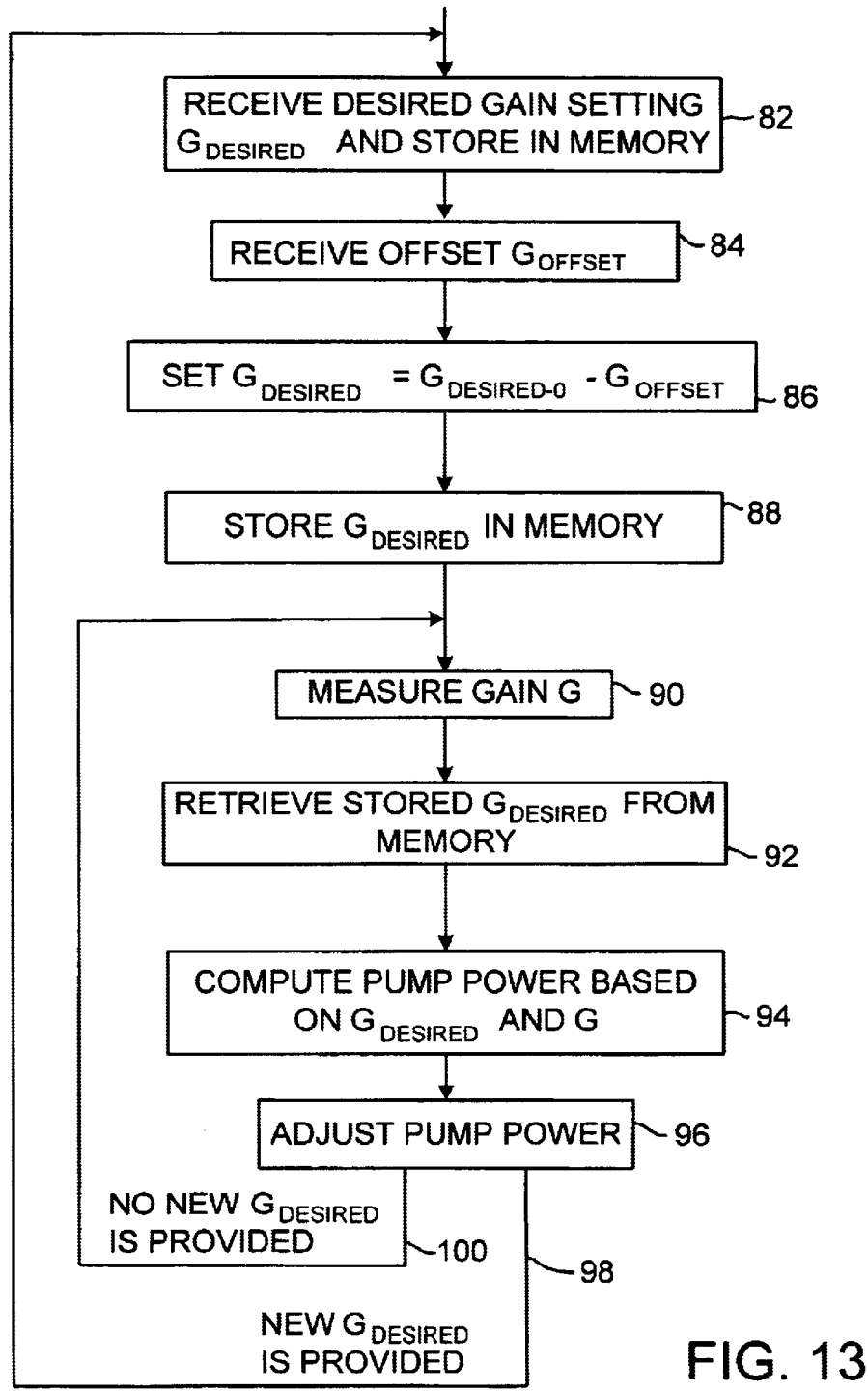
FIG. 13 is a flow chart of illustrative steps involved in controlling gain transients using the optical amplifier arrangement of FIG. 12 in accordance with the present invention.

If desired, amplifier 18 may have a variable optical attenuator that is located between optical taps 46 and 50, as shown in FIG. 12. Illustrative steps that may be used to control transients with this type of arrangement are shown in FIG. 13. At step 82, control unit 34 of FIG. 12 may receive information on a desired gain setting $G_{DESIRED\text{-}0}$ provided from the network management system or such information may be received from a local source. The value of $G_{DESIRED\text{-}0}$ may be stored in memory in the control unit. At step 84, information on an offset value $G_{OFFSET}$ that may be used to correct the desired gain may be retrieved from memory in control unit 34. Initially, $G_{OFFSET}$ may be set to zero.

At step 86, the desired value of the gain $G_{DESIRED}$ that is to be maintained in amplifier 18 may be calculated using the offset information $G_{OFFSET}$ and the gain setting $G_{DESIRED\text{-}0}$. step 88, the updated value of $G_{DESIRED}$ may be stored in memory in control unit 34.

At step 90, control unit 34 may use taps 46 and 50 and monitors 48 and 52 to measure the current gain of amplifier 18 (e.g., the amplifier gain stage shown in FIG. 12). The value of $G_{DESIRED}$ that is to be produced by amplifier 18 may be retrieved from memory at step 92. The value of $G_{DESIRED}$ that is retrieved from memory may reflect gain level adjustments made using the processes of FIG. 14. At step 94, control unit 34 may use information on the gain G that was measured in real-time and information on the desired gain $G_{DESIRED}$ to determine the appropriate pump power to produce with pumps 42 to prevent gain transients at step 94.

If a sudden fluctuation in input power has lead to a disparity between the measured gain and the desired gain, the pump power may be adjusted accordingly at step 96 to suppress gain transient effects (e.g., using a suitable feedback control technique).

If no new value of $G_{DESIRED\text{-}0}$ has been provided, control may loop back to step 90, as shown by path 100. If a new value of $G_{DESIRED\text{-}0}$ has been provided (e.g., from the network management system), control may loop back to step 82, as shown by line 98.

Figure 14:
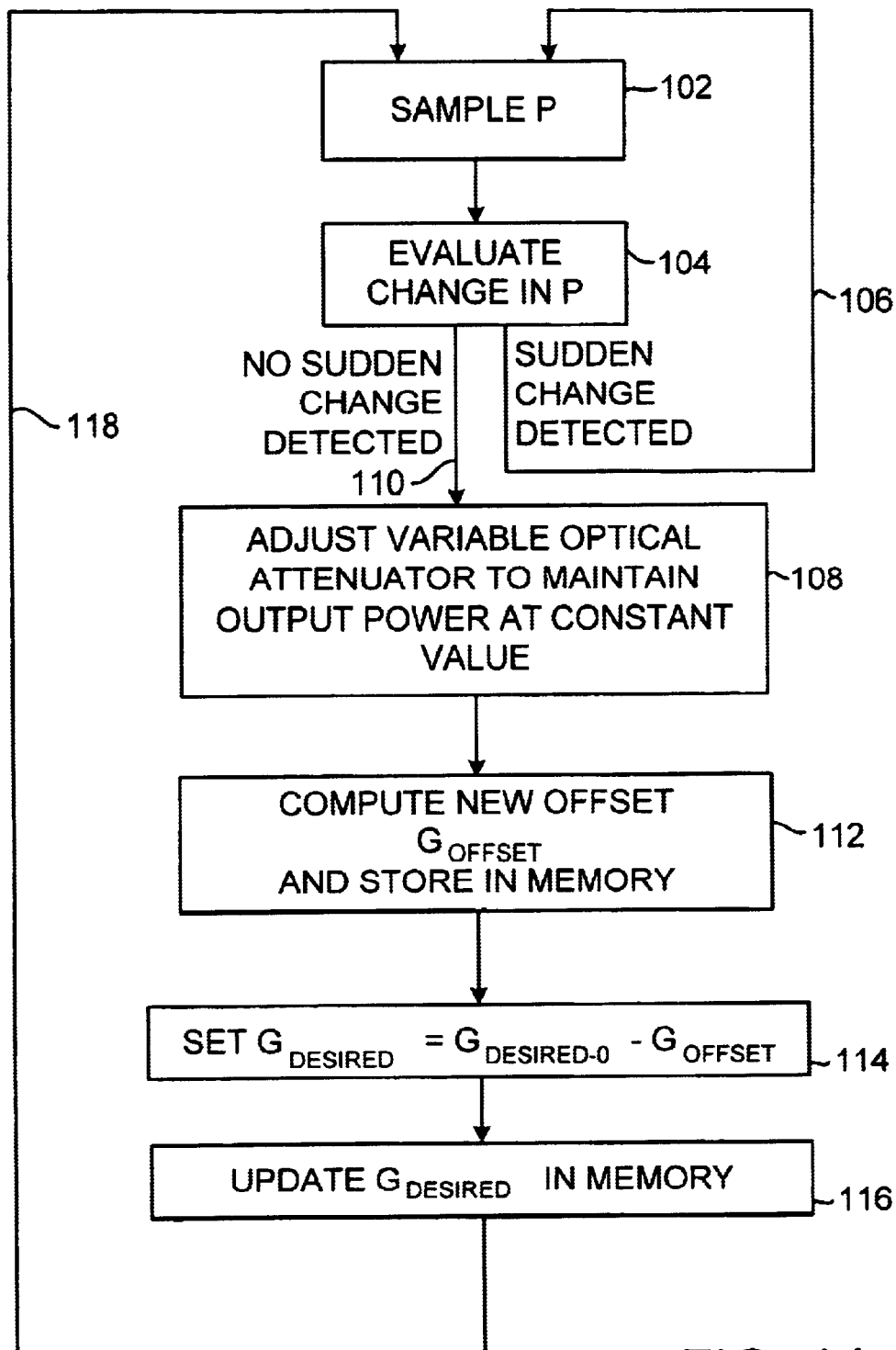
FIG. 14 is a flow chart of illustrative steps involved in automatically adjusting an optical amplifier of the type shown in FIG. 12 to produce a constant output power without adversely affecting the gain transient control process of FIG. 13 in accordance with the present invention.

While the steps of the transient control process of FIG. 13 are being performed, control unit 34 may also perform the drift compensation steps of FIG. 14. At step 102, control unit 34 may sample or otherwise measure the power of the optical data signals. For example, control unit 34 may acquire samples of the power at tap 46 or may acquire samples of the power at tap 50 using monitors such as monitors 48 and 52.

At step 104, the power measurements of step 102 may be evaluated by control unit 34. If the power has increased suddenly, the control unit may assume that a transient event (e.g., due to a channel add or drop operation) has occurred. In this case, no drift compensation steps are performed and control may loop back to step 102, as indicated by line 106. At the same time, the transient control process of FIG. 13 suppresses gain transients.

If no sudden change is detected during step 104, the control unit may assume that any changes in the power of the optical data signals are due to relatively slow drift effects. At step 108, the variable optical attenuator 54 may be adjusted to compensate for these drift effects. In particular, if the measured power is observed to be drifting upwards, the attenuation produced by the variable optical attenuator may be increased. If the measured power is observed to be drifting downwards, the attenuation produced by variable optical attenuator 54 of FIG. 12 may be reduced.

During drift compensation adjustments, the gain produced by fiber 36 of FIG. 12 is held constant. This ensures that the inversion level of the fiber remains constant and that no spectral tilt due to inversion level changes is introduced into amplifier 18, despite changes in input power due to drift effects. The gain of fiber 36 may be maintained at a constant level by making dB-for-dB adjustments in the gain of amplifier 18 (as measured between tap 46 and tap 50 of FIG. 12) relative to the changes made to variable optical attenuator 54. For example, if the attenuation of variable optical attenuator 54 is increased by 0.3 dB, the gain that is to be produced between tap 46 and tap 50 should be decreased by 0.3 dB. This ensures that the gain of fiber 36 is not changed, even though the output power provided at output fiber 40 is held constant in the face of a change in input power (i.e., in the face of a 0.3 dB increase in input power in this example).

With one suitable approach, the value of $G_{DESIRED}$ (the gain value to be used in control loop 100 of FIG. 13) may be adjusted by computing a new gain offset $G_{OFFSET}$ (e.g., a 0.3 dB offset when the attenuation of the variable optical attenuator is increased by 0.3 dB) at step 112 and by storing this value in memory. In general, the gain offset $G_{OFFSET}$ varies in a dB-for-dB fashion relative to the change in attenuation of variable optical attenuator 54.

At step 114, the gain set point for amplifier 18 $G_{DESIRED}$, may be updated using the new offset value and using the stored value of $G_{DESIRED\text{-}0}$. The updated value of $G_{DESIRED}$ may be stored in memory in control unit 34 at step 116. Control may then loop back to step 102, as shown by line 118. Once the updated value of $G_{DESIRED}$ is stored in memory at step 116, this value is available for use by control unit 34 when performing the transient control steps of FIG. 13. In particular, control unit 34 may retrieve the new value of $G_{DESIRED}$ from memory at step 92 of FIG. 13, during the performance of the steps within loop 100. If the network management system provides amplifier 18 with a new desired gain value at step 82 of FIG. 13, the stored offset information from step 112 of FIG. 14 may be used to translate this value into an offset-adjusted value during steps 84 and 86 of FIG. 13.

Figure 15:
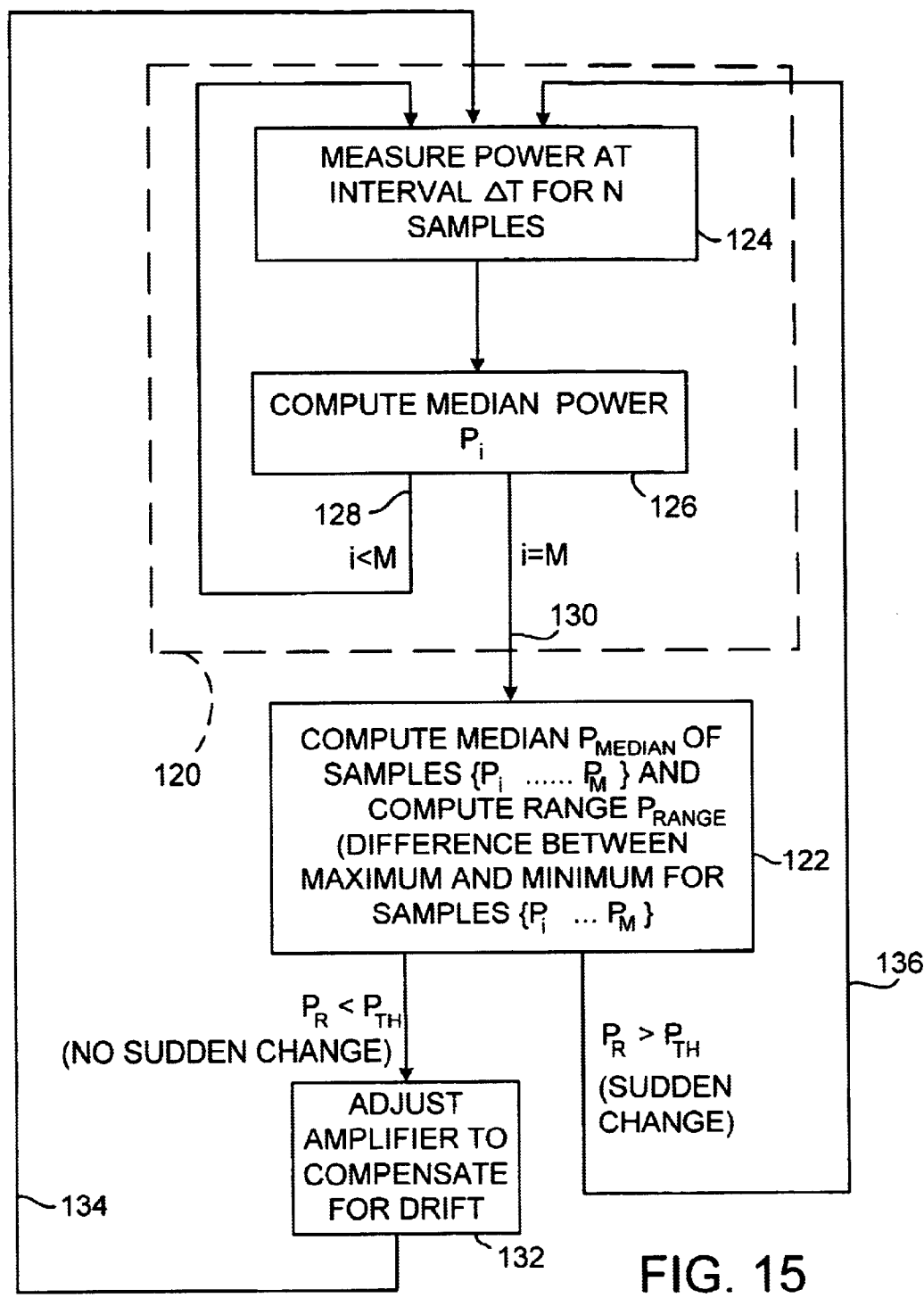
FIG. 15 is a flow chart of illustrative steps involved in processing optical amplifier optical power measurements to distinguish gain transient events from drift effects in accordance with the present invention.

Illustrative steps that may be used when monitoring the power of the optical data signals in the amplifier and when analyzing the monitored signals to distinguish transient events from drift effects are shown in FIG. 15. The steps within dotted line box 120 of FIG. 15 may be used for step 70 of FIG. 11 or for step 102 of FIG. 14. Step 122 of FIG. 15 may be used for step 72 of FIG. 11 or step 104 of FIG. 14.

As shown in FIG. 15, the power of the optical data signals may be measured at step 124. The power that is measured may be, for example, the input power or the output power of amplifier 18 or the power measured at another suitable location within amplifier 18. Control unit 34 may acquire multiple data samples. For example, the control unit may acquire N samples at an interval ΔT. The interval ΔT may be, for example, 1 ms. The value of N may be, for example, 10. After these N samples have been acquired, control unit 34 may compute the median of the N samples (power $P_i$) at step 124.

The sampling process of steps 124 and 126 may be repeated for M steps, as shown by line 128. The M steps may be completed in a total time τ. The value of τ may be on the order of several seconds. The value of M may be, for example, 50. After M median power measurements have been made, control may pass to step 122, as indicated by line 130.

At step 122, the control unit 34 may determine the median of the M samples $\{P_1 \ldots P_M\}$. The range $P_R$ of the M samples (i.e., the difference between the maximum and minimum sample powers) may also be determined.

If the value of $P_R$ is less than a predetermined threshold level $P_{TH}$, then the control unit 34 may assume that no sudden power change in the optical data signals occurred during the acquisition of the sampled data. The control unit may therefore adjust the amplifier to compensate for drift based on the sampled data at step 132. (Step 132 may be used for step 76 of FIG. 11 or steps 108–116 of FIG. 14). The control unit may, for example, use the median power of the M samples $\{P_1 \ldots P_M\}$ or other suitable power measurement data (e.g., the last sample power $P_M$) to adjust variable optical attenuator 54 and (depending on whether the variable optical attenuator is located between the gain stage taps or is located outside of the taps) to adjust the gain setting of the amplifier to ensure that the gain and inversion level of the optically-pumped rare-earth-doped fiber in the amplifier remains constant. Control may then return to step 124, as indicated by path 134.

If the value of $P_R$ (the range of the measured power) is greater than the predetermined threshold level $P_{TH}$, the control unit may assume that a transient event occurred during the data collection process. Rather than make a drift compensation adjustment based on this data, control may return to step 124, as indicated by line 136.

The process of adjusting the amplifier to compensate for drift (e.g., during an adjustment step such as step 132 of FIG. 15) may involve changes to amplifier components other than variable optical attenuator 54 and pumps 42. For example, if amplifier 18 has a dynamic filter such as dynamic filter 56 of FIG. 8 (e.g., in an amplifier that does not have a variable optical attenuator), drift compensation may involve making changes to the dynamic filter spectra produced by the dynamic filter. Pump power changes may be made during filter adjustments.

If desired, pump power adjustments may be made by themselves to maintain the total amplifier output power constant (compensating for drift), although this may allow the amplifier gain spectrum to tilt somewhat in rare-earth-doped fiber amplifiers. An example of a pump power drift compensation arrangement involves using pump power adjustments in an amplifier of the type shown in FIG. 12 in lieu of adjustments to variable optical attenuator 54. Variable optical attenuator 54 may be omitted if desired. Pump power adjustments may be made at step 96 of FIG. 13 to produce a desired gain value that has been established using a gain offset value $G_{OFFSET}$ that was calculated at step 112 of FIG. 14. Step 108 of FIG. 14 may be omitted, so the only calculations performed at step 112 of FIG. 14 may be those needed to determine what pump power changes are needed to produce a gain change of $G_{OFFSET}$. If desired, a pump power gain adjustment approach may be combined with other drift compensation techniques.

Although the gain transient suppression and drift compensation features described above have often been described in connection with optical amplifiers, this is merely illustrative. Any suitable network equipment may use these features if desired.

It will be understood that the foregoing is merely illustrative of the principles of this invention, and that various modifications can be made by those skilled in the art without departing from the scope and spirit of the invention.

What is claimed is:

1. An optical amplifier that amplifies optical data signals in a fiber-optic communications link, comprising:
   rare-earth-doped fiber that is optically pumped at a pump power to produce optical gain for the optical data signals;
   at least one optical monitor that is used to make power measurements on the optical data signals in the amplifier; and
   a control unit, wherein the control unit is configured to use the power measurements to distinguish transient events from drift effects, is configured to control the pump power to suppress gain transients in the rare-earth-doped fiber, is configured to compensate for the drift effects, and is configured to distinguish between transient events and drift effects by determining whether the optical data signal power measurements change suddenly.

2. The optical amplifier defined in claim 1 further comprising a variable optical attenuator, wherein the control unit is configured to adjust the variable optical attenuator when compensating for the drift effects.

3. The optical amplifier defined in claim 1, wherein the at least one optical monitor comprises at least two optical monitors, and wherein the optical amplifier further comprises first and second taps, wherein tapped optical data signals from the first and second taps are provided to the optical monitors, and wherein the optical amplifier further comprises a variable optical attenuator located between the first and second taps.

4. The optical amplifier defined in claim 1, wherein the at least one optical monitor comprises at least two optical monitors, and wherein the optical amplifier further comprises first and second taps, wherein tapped optical data signals from the first and second taps are provided to the optical monitors, and wherein the optical amplifier further comprises a variable optical attenuator located outside of the first and second taps.

5. The optical amplifier defined in claim 1 further comprising a dynamic filter, wherein the control unit is configured to adjust the dynamic filter when compensating for the drift effects.

6. An optical amplifier that amplifies optical data signals in a fiber-optic communications link, comprising:
   rare-earth-doped fiber that is optically pumped at a pump power to produce optical gain for the optical data signals;
   at least one optical monitor that is used to make power measurements on the optical data signals in the amplifier; and a control unit, wherein the control unit is configured to use the power measurements to distinguish transient events from drift effects, is configured to control the pump power to suppress gain transients in the rare-earth-doped fiber, and is configured to compensate for the drift effects and wherein the control unit is configured to acquire a plurality of samples of the optical data signals to use in distinguishing the transient events from the drift effects.

7. An optical amplifier that amplifies optical data signals in a fiber-optic communications link, comprising:

rare-earth-doped fiber that is optically pumped at a pump power to produce optical gain for the optical data signals;

at least one optical monitor that is used to make power measurements on the optical data signals in the amplifier; and a control unit, wherein the control unit is configured to use the power measurements to distinguish transient events from drift effects, is configured to control the pump power to suppress gain transients in the rare-earth-doped fiber, and is configured to compensate for the drift effects, wherein at least some of the power measurements are made downstream from the rare-earth-doped fiber, and wherein the control unit is configured to acquire a plurality of samples of the optical data signals during the power measurements to use in distinguishing the transient events from the drift effects.

8. The optical amplifier defined in claim 1 wherein the control unit is configured to adjust the pump power when compensating for the drift effects.

9. The optical amplifier defined in claim 1 wherein the control unit does not adjust the pump power when compensating for the drift effects.

10. The optical amplifier defined in claim 1 wherein the control unit is configured to adjust both the pump power and a variable optical attenuator when compensating for the drift effects.

11. The optical amplifier defined in claim 1 wherein the control unit updates a desired gain value when compensating for the drift effects.

12. An optical amplifier that amplifies optical data signals in a fiber-optic communications link, comprising:

rare-earth-doped fiber that is optically pumped at a pump power to produce optical gain for the optical data signals;

at least one optical monitor that is used to make power measurements on the optical data signals in the amplifier; and a control unit, wherein the control unit is configured to use the power measurements to distinguish transient events from drift effects, is configured to control the pump power to suppress gain transients in the rare-earth-doped fiber, and is configured to compensate for the drift effects and wherein the control unit is configured to acquire a plurality of power samples for the optical data signals, is configured to compute a median power from among the samples, and is configured to use information on the median power in distinguishing between gain transients and drift effects.

13. An optical amplifier that amplifies optical data signals in a fiber-optic communications link, comprising:

rare-earth-doped fiber that is optically pumped at a pump power to produce optical gain for the optical data signals;

at least one optical monitor that is used to make power measurements on the optical data signals in the amplifier; and a control unit, wherein the control unit is configured to use the power measurements to distinguish transient events from drift effects, is configured to control the pump power to suppress gain transients in the rare-earth-doped fiber, and is configured to compensate for the drift effects and wherein the control unit is configured to acquire a plurality of power samples for the optical data signals, is configured to compute a median power and a power range from among the samples, and is configured to use information on the median power and power range in distinguishing between gain transients and drift effects.

14. The optical amplifier defined in claim 1 wherein the control unit is configured to receive information on a desired gain setting for the amplifier from a network management system and is configured to adjust the desired gain setting from the network management system when compensating for the drift effects.

* * * * *